E. N. MAULL.
BEAN AND PEA HULLING MACHINE.
APPLICATION FILED JUNE 9, 1916.
1,232,064.
Patented July 3, 1917.
3 SHEETS—SHEET 1.
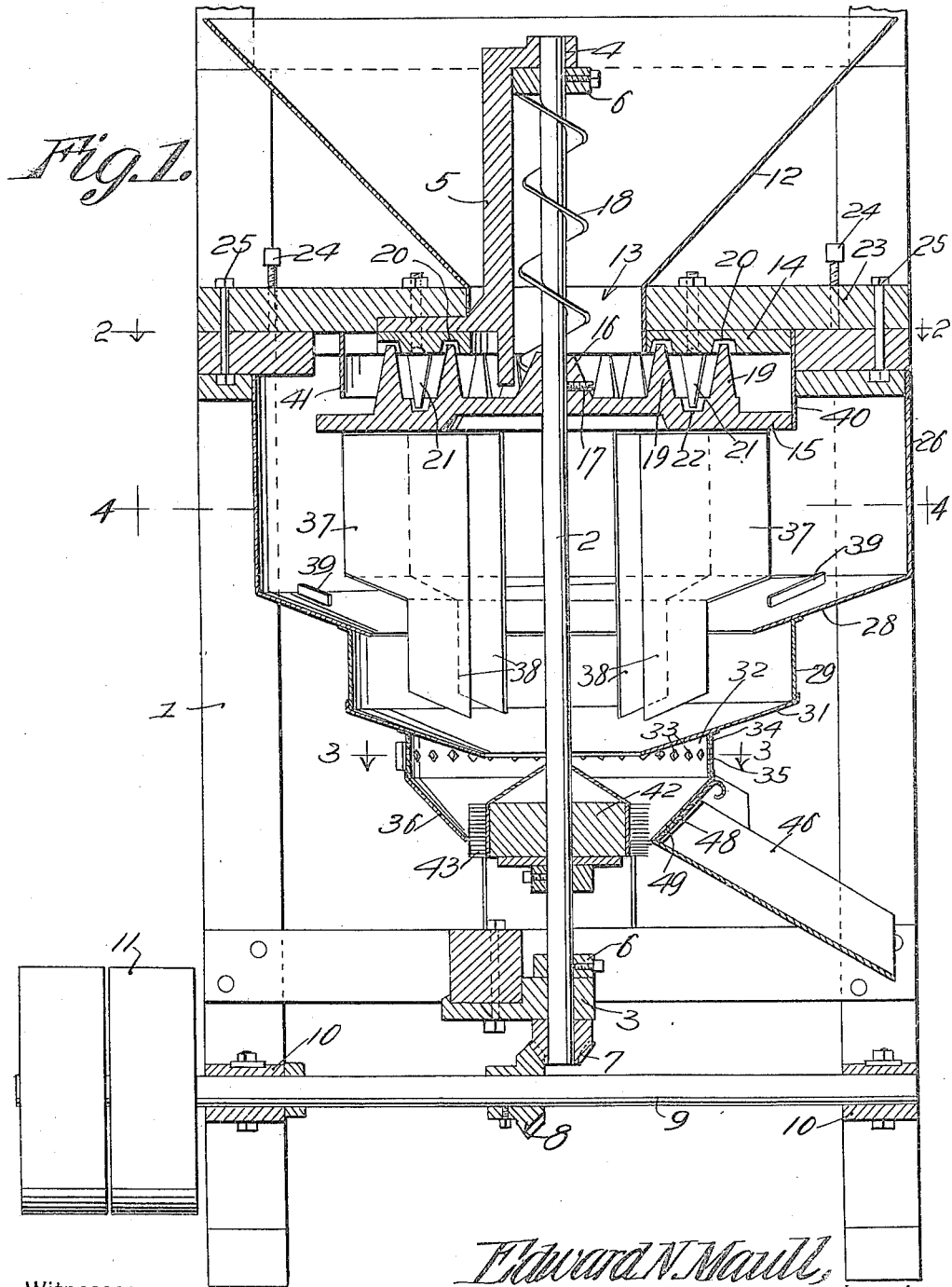
Fig. 1.
Witnesses
Edward N. Maull,
inventor
by 
Attorneys E. N. MAULL.
BEAN AND PEA HULLING MACHINE.
APPLICATION FILED JUNE 9, 1916.
1,232,064.
Patented July 3, 1917.
3 SHEETS—SHEET 2.
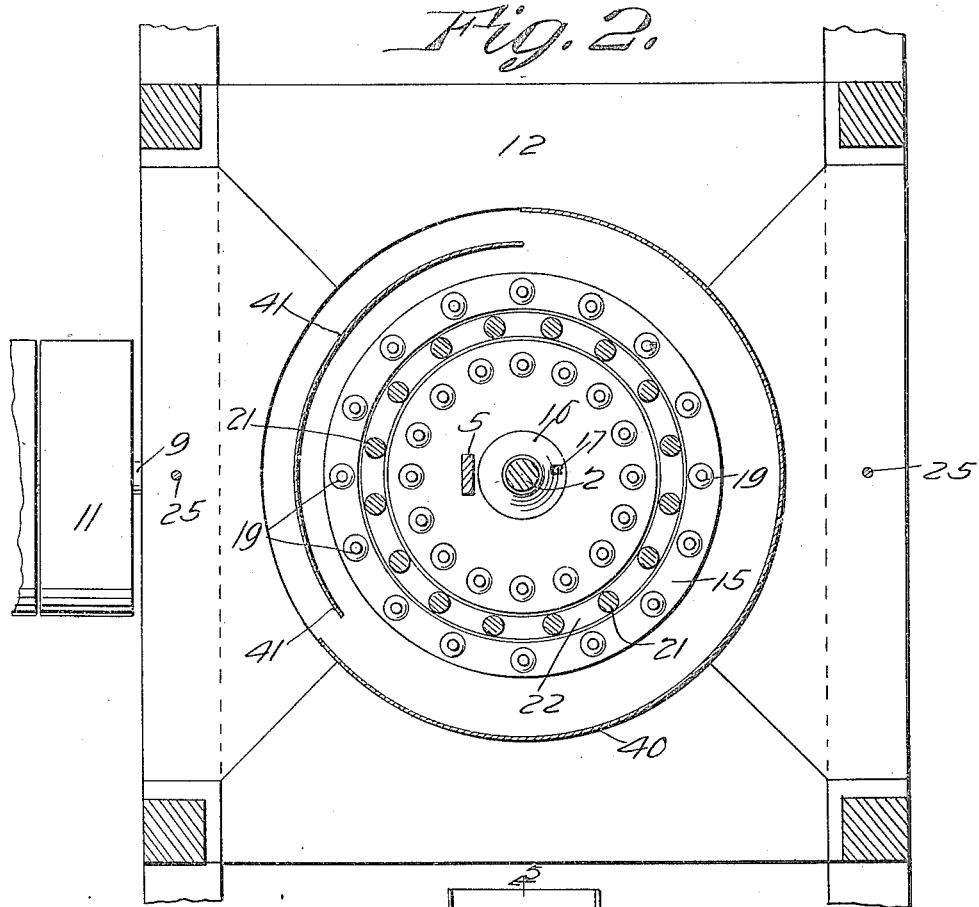
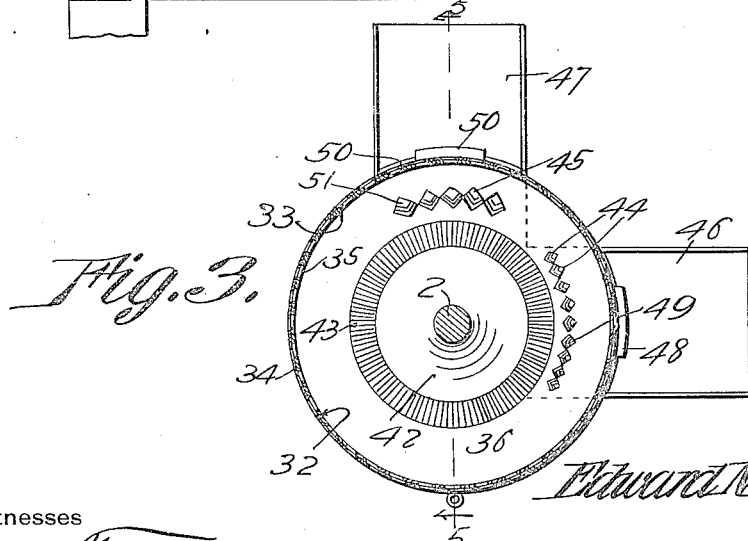
Witnesses
Edward N. Maull,
Inventor
by
Attorneys E. N. MAULL.
BEAN AND PEA HULLING MACHINE.
APPLICATION FILED JUNE 9, 1916.
1,232,064.
Patented July 3, 1917.
3 SHEETS—SHEET 3.
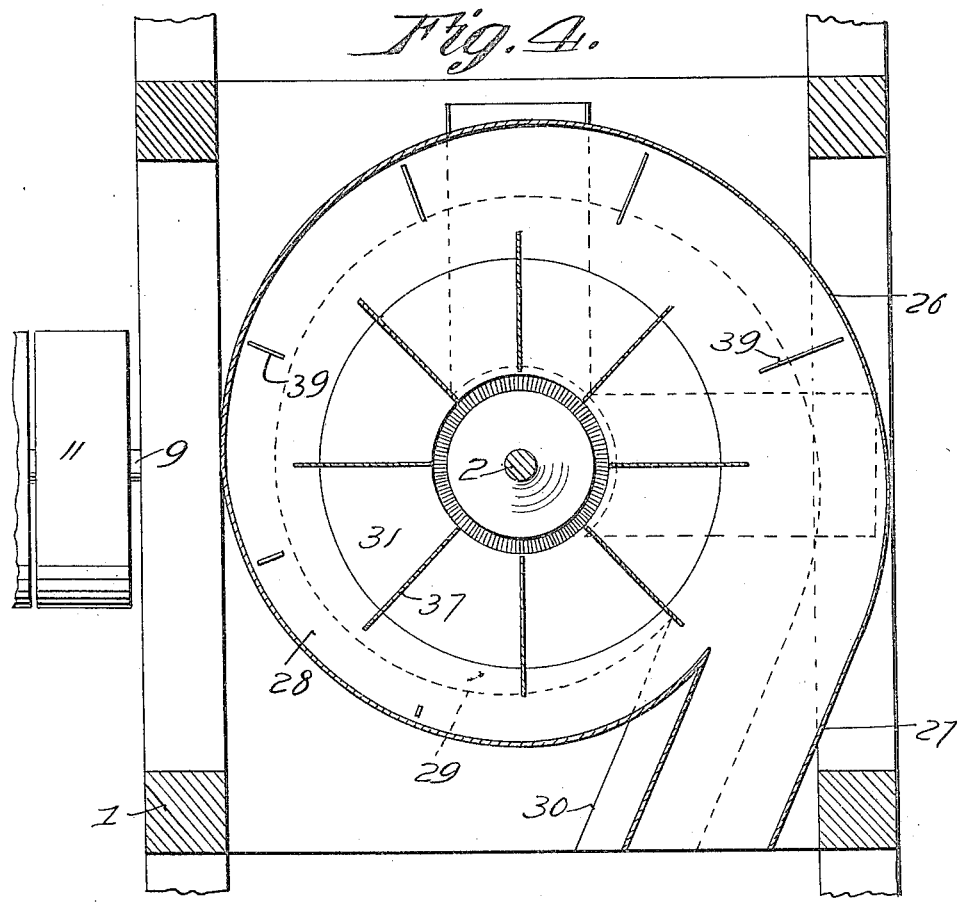
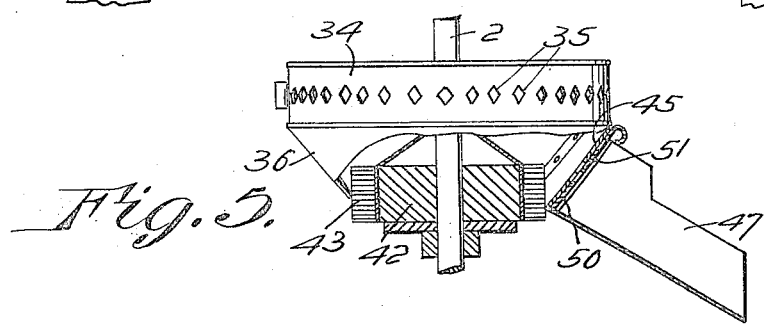
Witnesses
Edward N. Maull,
Inventor
by
Attorneys

UNITED STATES PATENT OFFICE.

EDWARD N. MAULL, OF JACKSONVILLE, FLORIDA, ASSIGNOR OF ONE-HALF TO HENRY C. PLOOF, OF JACKSONVILLE, FLORIDA.

BEAN AND PEA HULLING MACHINE.

1,232,064.

Specification of Letters Patent.

Patented July 3, 1917.

Application filed June 9, 1916. Serial No. 102,707.

*To all whom it may concern:*

Be it known that I, EDWARD N. MAULL, a citizen of the United States, residing at Jacksonville, in the county of Duval and State of Florida, have invented a new and useful Bean and Pea Hulling Machine, of which the following is a specification.

The present invention relates to bean and pea hulling machines, and aims to provide a novel and improved machine of that character.

An object of the invention is the provision of a machine of the nature indicated having novel means for separating the hulls, vines and other chaff from the beans or peas.

A further object of the invention is the provision in a machine of this character, of novel means for sizing, cleaning and polishing the beans or peas.

It is also within the scope of the invention to provide a bean and pea hulling machine improved generally in its construction and details to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a central vertical section of the machine, portions being shown in elevation.

Figs. 2, 3 and 4 are horizontal sections taken on the respective lines 2—2, 3—3 and 4—4 of Fig. 1.

Fig. 5 is a vertical section taken on the line 5—5 of Fig. 3, portions being shown in elevation.

The machine embodies a suitable frame 1 for supporting the various working parts, and a vertical shaft 2 is disposed centrally within the frame and has its lower terminal journaled through a bearing 3 carried by the frame and its upper terminal journaled within a bearing 4 carried by the upper end of a standard 5 attached to the frame. Collars 6 are secured to the shaft 2 and bear against the bearings 3 and 4, the lower collar 6 seating upon the bearing 3 to support the shaft 2. The shaft 2 can be rotated in any suitable manner, either mechanically or manually, and as illustrated there is a bevel gear 7 secured to the lower end of the shaft 2 meshing with a bevel gear 8 secured upon a horizontal drive shaft 9 journaled in bearings 10 carried by the frame, said shaft 9 having a pulley 11 whereby the shaft can be belted to an engine or prime mover.

Disposed within the upper portion of the frame 1 is a circular hopper 12 having the depending spout 13 extending within the central opening of a stationary disintegrating head or disk 14, in the form of an annular plate, and which is carried by the frame as will hereinafter more fully appear. Disposed below and parallel with the head or disk 14 is a rotatable disintegrating head or disk 15 which is provided with a conical hub 16 secured by means of a set screw 17 or otherwise to the shaft 2. The disk 15 is disposed below but adjacent the spout 13 of the hopper 12, and the conical hub 16 serves to deflect or direct the material which drops onto the disk 15 from the spout 13, radially from the center of the disk 14. To facilitate the feeding of the beans or peas and the vines down through the spout 13 to the disintegrating disks, a spiral feed 18 is carried by the shaft and extends from the upper collar 6 to the hub 16 of the disk 15. Thus, when the shaft 2 is rotated, the spiral feed 18 will force or feed the material downwardly through the spout 17. The standard 5 is arranged adjacent the spiral feed 18 to prevent the vines from becoming wrapped upon the shaft and spiral feed, and to assure of the vines being fed downwardly to and between the disintegrating disks.

The disintegrating disks 14 and 15 are provided with coöperable means for tearing the vines to pieces and for breaking up the pods or hulls to liberate the beans or peas, and for this purpose, the lower rotatable disk 15 has two annular series of upstanding teeth 19, and the disk 14 has annular grooves 20 receiving the free ends of said teeth. The disk 14 has an annular series of depending teeth 21 working between the teeth 19 of the disk 15, and the disk 15 has an annular groove 22 receiving the ends of the teeth 21. The two disks may be provided with various numbers and arrangements of coöperating teeth, said teeth being preferably tapered from their basal ends to their free ends, as seen in Fig. 1, and although the teeth are of circular cross section as illustrated, they can be of any other suitable formation.

The upper stationary disk 14 is mounted for vertical adjustment, whereby when the disk 14 is adjusted vertically, the spaces between the teeth 19 and 21 are changed, which is desirable with different grades of beans and peas for the proper breaking of the pods or hulls without injury to the beans or peas. The disk 14 is bolted or otherwise secured to the lower surface of a horizontal carrier 23 having a central opening within which the spout 13 is fitted, whereby the hopper 12 is also adjusted with the disk 14, and the standard 5 is secured to this carrier 23 also. Adjusting screws 24 are threaded through the carrier 23 and bear upon parts of the frame 1 whereby said screws can be screwed downwardly to raise the carrier 23 and disk 14 secured thereto, clamping bolts 25 being engaged through the carrier and corresponding parts of the frame, to clamp the carrier at any adjusted position. By loosening the bolts 25, and rotating the screws 24, the carrier 23 can be adjusted upwardly or downwardly, as desired, to set the disk 14 relative to the disk 15 according to the grade of beans or peas which are being hulled. A fan or blower casing 26 is secured to the frame at its upper edge below the carrier 23 and surrounds the disk 15, said casing 26 having a tangential outlet 27, and a hopper-shaped bottom 28. A secondary fan or blower casing 29 has its upper edge secured to the bottom 28 of the primary fan casing 26, and is provided with a tangential outlet 30, the casing 29 being of smaller diameter and of less depth than the casing 26. The casing 29, like the casing 26, has a hopper-shaped bottom 31, each casing having a central opening in its bottom. A circular air inlet casing or shell 32 has its upper edge attached to the bottom 31 of the casing 29, and is provided with air inlet apertures 33, and upon this casing 32 an annular shutter 34 is mounted for rotation and is provided with apertures 35 adapted to be brought into and out of registration with the apertures 33, to control the flow of air into the casing 32. Attached to the lower edge of the air inlet casing 32 is a hopper 36 forming with the casing 32 a chamber in which the beans or peas are sized, cleaned and polished, as will hereinafter more fully appear.

Radial fan blades 37 have their upper ends secured to the disk 15 so that said blades depend from said disk, the inner edges of said blades being spaced from the shaft 2 and their outer edges overhang the bottom 28 of the casing 26. The main blades 37 which are located within the casing 26 are provided with secondary fan blades 38 depending therefrom adjacent their inner edges. The secondary blades 38, which form part of the blades 37, are of narrower width and project downwardly through the opening in the bottom 28 of the casing 26 into the secondary fan casing 29. The fan blades are rotated with the disk 15 and when rotated create a centrifugal action of the air within the casings 26 and 29 to suck the air upwardly and axially from the air inlet casing 32 and to eject the air through the outlets 27 and 30. Radial upstanding ribs 39 are secured upon the bottom 28 of the casing 26 to prevent the beans or peas from rolling around said bottom to the outlet 27 due to the whirling motion of the air, although the beans or peas can roll down the bottom 28 to drop into the secondary fan casing 29. The bottom 31 of the casing 29 can also be provided with ribs similar to the ribs 39 of the casing 26, although this may not be necessary.

An arcuate apron 40 is secured to the carrier 23 or the edge of the disk 14 and depends therefrom, the lower edge of the apron 40 overlapping the edge of the disk 15, and a second arcuate apron 41 is carried by the carrier 23 and has its ends terminating adjacent but spaced from the ends of the apron 40. There are openings between the ends of the two aprons, and the lower edge of the apron 41 is spaced above the disk 15, to permit of the disintegrated material passing off of the disk 15 and falling into the fan casing 26.

A brush is carried by the shaft 2 within the lower opening of the hopper 36, and embodies a head 42 secured to the shaft in any suitable manner and provided around its periphery with outstanding bristles 43 working along the lower inner edge of the hopper 36 and rising to a point above the opening of said hopper. The hopper 36 is provided adjacent its lower inner edge with a series of sizing apertures 44, located at one side of the hopper, and said hopper is provided, preferably at another side, with a second series of sizing apertures 45 larger than the apertures 44 and located near the upper outer edge of the hopper. Inclined chutes 46 and 47 have their upper ends attached to the hopper 36 below the respective apertures 44 and 45. A shutter 48 is mounted slidably upon the exterior of the hopper 36 within the chute 46 and is provided with apertures 49 adapted to be brought into and out of registration with the apertures 44, and a similar shutter 50 is mounted slidably upon the exterior of the hopper 36 within the chute 47 and is provided with apertures 51 adapted to be brought into and out of registration with the apertures 49. By adjusting the shutters 48 and 50, sizing apertures of suitable proportions are provided for the discharge of the various sizes or grades of beans or peas.

The operation of the machine is as follows: The beans or peas together with their vines and all are dumped into the hopper 12, and are fed downwardly by the spiral feed 18, the standard 5 preventing the vines from becoming wrapped around or entangled with the feeding device. Since the vines can be thrown into the hopper with the beans or peas, this eliminates the necessity of picking the pods from the vines. The beans or peas and their vines are delivered to the spout 13 by the feed and pass onto the disk 15 which in being rotated with the shaft 2 will rotate the material thereon. The shaft 2 is rotated at a relatively high speed, whereby the material upon the disk 15 is carried radially by centrifugal action, and the vines and pods being carried around with the teeth 19 and coming into engagement with the stationary teeth 21, will result in the vines being torn to pieces, and the pods broken to dislodge the beans or peas. In this connection, it is to be noted that the carrier 23 can be adjusted vertically to regulate the spaces between the teeth 19 and 21, in order that the pods will be properly broken without injury to the beans or peas. The aprons 40 and 41 prevent the air being blown upwardly between the disintegrating disks to any appreciable extent, and therefore prevent the air currents from interfering with the disintegrating action taking place between the disks 14 and 15. The disintegrated material drops from the disk 15 into the primary fan casing 26, and the air being directed radially by the blades 37 will carry the hulls, pieces of vine, leaves and other chaff with it toward and around the walls of the casing 26, and the chaff will be directed out through the outlet 27, while the beans or peas which are too heavy to be carried with the air, will drop onto the bottom 28 of said casing, the ribs 39 preventing said peas or beans from rolling toward the outlet 27 with the air current. When the beans or peas run from the bottom 28 into the casing 29, they are again subjected to the action of the air within the casing 29, the air being directed radially within said casing 29 by the blades 39 and being forced through the outlet 30 to carry out any chaff which drops into the casing 29. The peas or beans drop onto the bottom 31 of the casing 29 and from there roll into the hopper 36, falling onto the rotatable brush. The air is drawn upwardly from the apertures 33 through the bottom of the hopper 31, and the air passing upwardly through the opening of said bottom 31 will carry any remaining chaff with it, which chaff might pass through the opening in said bottom 31. The peas or beans which drop onto or within the hopper 36, roll down against the bristles 43 of the brush, which in being rotated will roll the beans or peas around the hopper 36, and will serve to clean and polish them, the sand and other fine particles passing downwardly between the lower inner edge of the hopper 36 and the bristles 43. As the peas or beans accumulate within the hopper 36, the smaller sizes thereof pass through the apertures 44 and 49 into the chute 46, and the smaller size of peas or beans can be caught by any suitable receptacle. The larger sizes of peas or beans will rise within the hopper 36 and pass out through the apertures 44 and 51 into the chute 47. In this connection, it will be noted that the shutters 48 and 50 can be adjusted to properly size the peas or beans. Any chaff dropping into the hopper 36 will gradually be worked to the surface, and will come into contact with the air flowing into the casing 32 from the apertures 33, whereby said chaff will ultimately be sucked upwardly into the fan casings to be discharged.

Having thus described the invention, what is claimed as new is:

1. A machine of the character described embodying a hopper having a lower opening and sizing apertures in its walls, and rotatable means within said hopper permitting only fine particles to pass through said opening and for agitating and rotating the contents of the hopper around the walls thereof.

2. A machine of the character described, embodying a hopper having a lower opening and sizing apertures in its walls, and means rotatable within said opening and projecting upwardly within the hopper for permitting only fine particles to pass through said opening around the edge thereof and for agitating and rotating the contents of the hopper around the walls thereof.

3. A machine of the character described, embodying a hopper having a lower opening and sizing apertures of different sizes, the smaller apertures being nearer said opening than the larger apertures, rotatable means within the hopper for carrying the contents thereof around its walls, and shutters for the smaller and larger apertures having apertures to move into and out of registration therewith.

4. A machine of the character described embodying a hopper having sizing apertures and a lower opening, and a rotatable brush within said opening having bristles directed toward the walls of the hopper.

5. A machine of the character described comprising a hopper having sizing apertures and a lower opening, and a rotatable brush mounted within said opening and having outstanding bristles working adjacent the inner edge of said hopper and rising within the hopper to rotate the contents thereof.

6. A machine of the character described embodying a hopper having a lower opening and sizing apertures of different sizes, the smaller apertures being nearer said opening than the larger apertures, and a rotatable brush within said opening having outstanding bristles.

7. A machine of the character described embodying a hopper having a lower opening and sizing apertures in its walls, means rotatable within the hopper for permitting only fine particles to pass through said opening and for agitating and rotating the contents of the hopper around the walls thereof, and means for sucking air from the upper portion of the hopper to remove chaff at the surface of the contents of the hopper.

8. A machine of the character described, embodying a hopper having a lower opening and sizing apertures in its walls, means rotatable in the hopper permitting only fine particles to pass through said opening and for agitating and rotating the contents of the hopper around its walls, means for sucking air upwardly from the central portion of the hopper, and means for directing the air over the upper edge of the hopper to remove chaff from the surface of the contents of the hopper, 9. A machine of the character described, embodying a hopper having a lower opening and sizing apertures in its walls, a rotatable brush within and projecting above said opening and having outstanding bristles permitting only fine particles to pass through said opening, and means for sucking air from the upper portion of said hopper to move chaff from the surface of the contents of the hopper, 10. A machine of the character described, embodying a hopper having a lower opening and sizing apertures in its walls, a rotatable brush within and projecting above said opening and having outstanding bristles permitting only fine particles to pass through said opening, a member above the hopper having a central opening for the upward suction of air therethrough, and means between said member and the upper edge of the hopper for admitting air to remove chaff from the surface of the contents of the hopper.

In testimony that I claim the foregoing as my own, I have hereto affixed my signature in the presence of two witnesses.

EDWARD N. MAULL.

Witnesses:
JOHN CARTER,
ADELE WOODS.

Copies of this patent may be obtained for five cents each, by addressing the "Commissioner of Patents, Washington, D. C."